United States Patent [19]

Schmitt

[11] E Re. 30,559

[45] Reissued Mar. 31, 1981

[54] NON-RISE FAUCET ASSEMBLY

[75] Inventor: William C. Schmitt, Milwaukee, Wis.

[73] Assignee: Milwaukee Faucets, Inc., Milwaukee, Wis.

[21] Appl. No.: 73,697

[22] Filed: Sep. 10, 1979

Related U.S. Patent Documents

Reissue of:

[64] Patent No.: 4,064,900
Issued: Dec. 27, 1977
Appl. No.: 735,595
Filed: Oct. 26, 1976

U.S. Applications:

[63] Continuation of Ser. No. 929,678, Jul. 31, 1978, abandoned.

[51] Int. Cl.[3] ..... F16K 11/20

[52] U.S. Cl. ..... 137/315; 137/606; 285/DIG. 22

[58] Field of Search ..... 137/315, 606; 251/304, 251/288

[56] References Cited

U.S. PATENT DOCUMENTS

| | | | |
|---|---|---|---|
| 2,103,231 | 9/1963 | Moen | 137/625.14 |
| 3,570,537 | 3/1971 | Kelly | 137/625.15 |
| 3,698,418 | 10/1972 | Schmitt | 137/315 |
| 3,788,601 | 1/1974 | Schmitt | 137/636.3 |
| 4,064,900 | 12/1977 | Schmitt | 137/315 |
| 4,109,672 | 8/1978 | Szemeredi | 137/315 |

*Primary Examiner*—Martin P. Schwadron
*Assistant Examiner*—A. Michael Chambers
*Attorney, Agent, or Firm*—Arnstein, Gluck, Weitzenfeld & Minow

[57] ABSTRACT

A faucet assembly having a rotatable, non-rise stem and which stem can be axially removed from its shank, the assembly having a removable retainer clip which slides into a transverse slot in the shank and forces the stem into proper seating engagement with the stem and locks the stem in place. A faucet handle has a skirt which is slipped over the retainer clip and prevents its removal from the shank. Two such faucet assemblies are mounted on a central shank by a telescoping connection, and interengaging means are provided between the telescoping parts to permit their easy assembly, but once they are assembled they are locked together and prevented from being pulled apart.

10 Claims, 7 Drawing Figures

NON-RISE FAUCET ASSEMBLY

Matter enclosed in heavy brackets [ ] appears in the original patent but forms no part of this reissue specification; matter printed in italics indicates the additions made by reissue. *This application is a continuation of U.S. Pat. application Ser. No. 929,678, filed July 31, 1978 now abandoned.*

BACKGROUND OF THE INVENTION

The invention pertains to non-rise faucets of the type shown in my U.S. Pat. No. 3,788,601 which issued Jan. 29, 1974, and entitled Non-Rise Valve for Faucets or the like; and U.S. Pat. No. 3,916,951 which issued Nov. 4, 1975 for Hot and Cold Water Mixing Valve, and wherein the elongated cartridge has a disc valve member at its lower end which forms a valve with apertures in the shank body. These stems must be accurately positioned within the shank so as to provide proper sealing engagement therewith. At the same time, the stem must be readily and easily removed for replacement of the o-rings or repair of other parts and for cleaning thereof.

These faucet assemblies must often be coupled together to serve a single spout and such assembly must be accomplished in an easy manner, notwithstanding the tolerances and exact distances which must be maintained between the separate faucets and their mounting, for example, in the cabinet or counter top. Thus, it is highly desirable to be able to assemble the shank with one another and with the center spout in an easy manner and without special tools. Once the shanks are assembled to the central spout, there is no reason to disassemble them, because of the lack of relative movement between the parts.

SUMMARY OF THE PRESENT INVENTION

The present invention provides a faucet assembly having a fluid receiving shank and in which is removably mounted an elongated valve stem for forming a valve with the shank to permit the ingress and egress from the faucet. The invention contemplates a removable retainer clip received in a generally transverse slot in the shank and by means of which clip the stem is accurately and forceably located in proper valve sealing engagement with the shank. The clip prevents accidental removal of the stem and yet also permits easy removal of the clip when the stem is to be removed for inspection and/or repair.

The invention also contemplates a faucet handle which has a downwardly depending skirt that surrounds and covers the retainer clip and prevents its unintended removal from the faucet assembly.

Another aspect of the present invention relates to inter-engaging, telescoping connections between two faucet assemblies of the above type with a central shank assembly which supports a single spout that is served by both faucets. The connection between the central shank and the stem shanks is such that the telescoping members have inter-engaging and non-releasable means between them which permit their easy assembly, but prevent their disassembly. More specifically, these inter-engaging means are of such a size and shape that they are readily insertable together but cannot be disconnected once they are engaged.

These and other objects and advantages of the present invention will appear hereinafter as this disclosure progresses, reference being had to the accompanying drawings.

DESCRIPTION OF A PREFERRED EMBODIMENT

Figure 1:
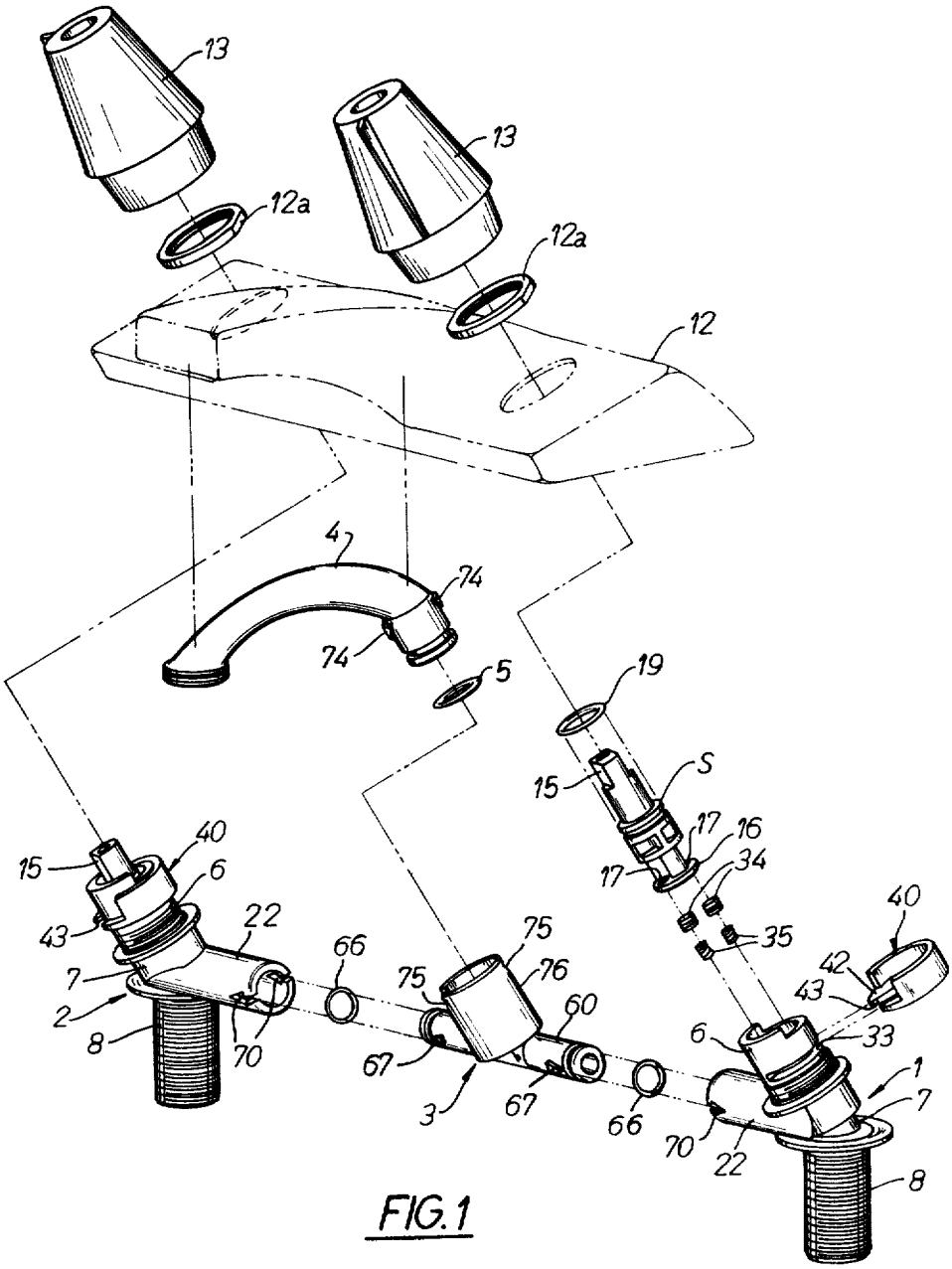
FIG. 1 is a perspective, exploded view of a faucet assembly embodying the present invention.

FIG. 1 is an exploded perspective view of the various parts of a complete, dual faucet assembly made in accordance with the present invention and includes a first valve assembly 1, a second valve assembly 2 which are engageable with a central shank 3, which central shank in turn supports a single spout 4 and is sealingly engaged therewith with the conventional o-ring 5.

Figure 4:
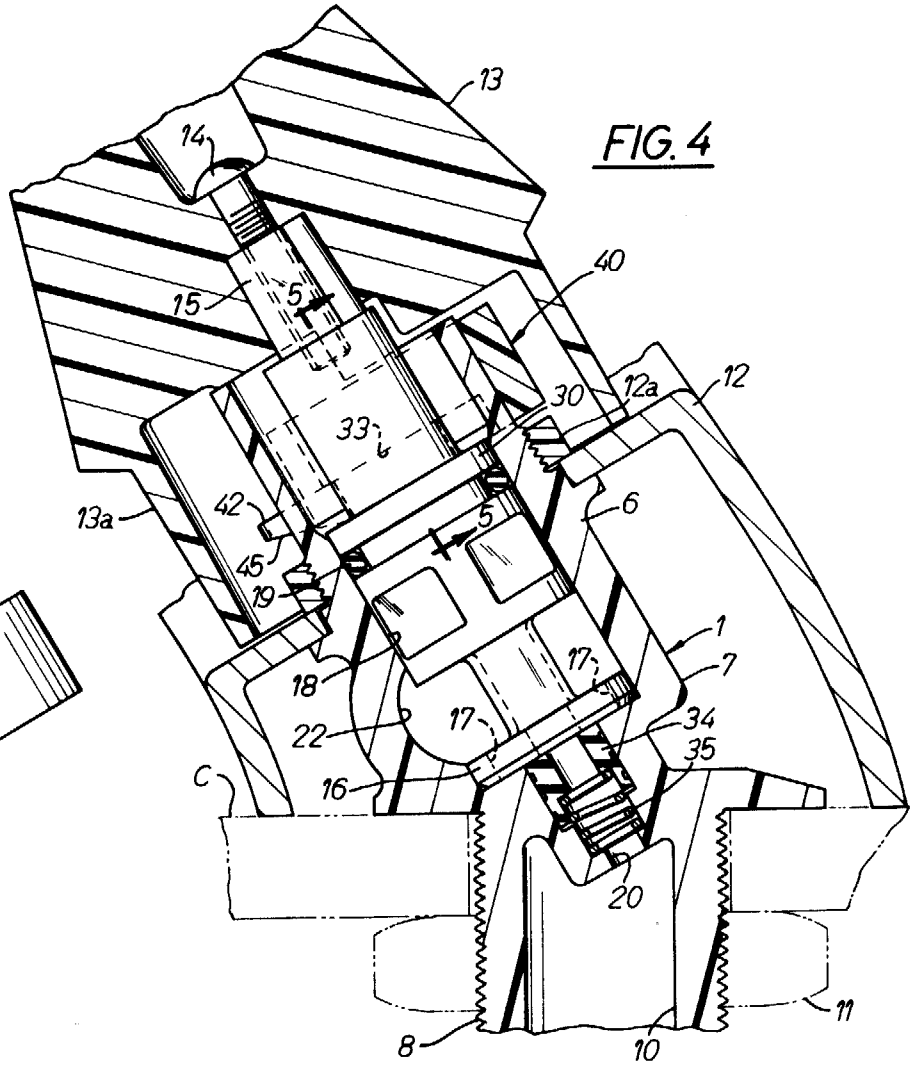
FIG. 4 is a fragmentary, vertical, cross sectional view, on an enlarged scale of part of one assembly as shown in FIG. 1.

The valve assemblies 1 and 2 are identical in construction and therefore a detailed description of only one is believed to be necessary and desirable. The valve assembly 1 includes an elongated stem S which is axially insertable in an upper portion 6 of the entire *unitary* shank 7. The shank 7 also includes a lower portion 8 which is threaded on the outside and through which fluid is introduced from a supply, not shown, by means of the inner opening 10 (FIG. 4). A nut 11 is threadably engaged on the portion 8 and holds the valve assembly captive on a counter C. The complete assembly also includes a cover 12 and its lock nut 12a. As clearly shown in FIG. 4, handles 13 are secured by cap screws 14 on the upper, non-circular cross sectional end 15 of the stem.

Referring in greater detail to the stem, it includes a lower disc valve member 16 having apertures 17 therethrough and which are alignable and non-alignable with corresponding openings in the shank when the stem is rotated by the handle 13 in the known manner. The stem is mounted in a chamber 18 in the upper portion of the shank and is in sealing engagement therewith by means of the conventional o-ring 19. Thus, when the stem is rotated to the open position, water is permitted to flow from passage 10 in the lower portion of the shank and upwardly through the openings 20, through opening 17 in the valve disc and then out of a laterally extending conduit 22 which is in communication with chamber 18.

Referring in still greater detail to the stem, it will be noted that it has a radially extending shoulder 30 formed transversely adjacent its upper end. When in assembled position, this shoulder is positioned in alignment with the lower edge of the transverse grooves *or slots* 33 which extend partially through the upper portion of the shank. When in this properly assembled position, the valve disc 16 bears in sliding sealing engagement with resilient valve seat member 34 which is spring loaded by springs 35 against the lower surface of the disc in the known manner. It is important that the valve stem is properly located in this position and remains in that position for proper operation of the valve.

In order to insure that the stem is properly inserted in the shank as above described, and remains locked in that position where it can rotate during its valving function, a retainer clip 40 is insertable in the generally transverse [slot] *slots* 33 in the shank. The retainer clip has a disc-like portion 42 in which is [formed] *provided* a recess 43 extending transversely across the disc-like portion 42 *to form a blocking surface for the shoulder 30 on each side of the recess 43.* One edge of the retainer clip 40 is formed with its lower surface as a bevelled edge 45, which bevelled edge is adapted to ride up and engage the shoulder 30 when the clip is inserted into the transverse slot 33, and said recess embraces the stem.

Figure 6:
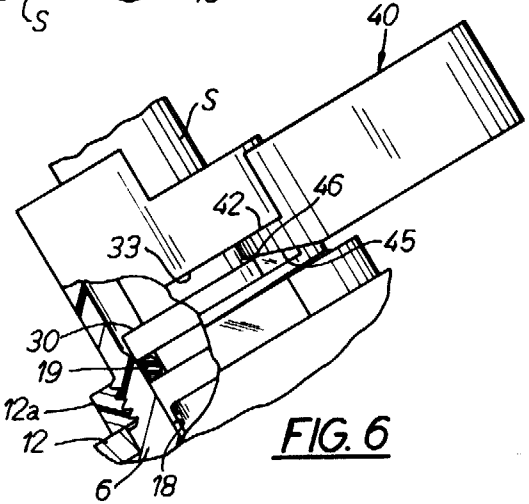
FIG. 6 is a fragmentary view of a portion of the device as shown in FIG. 4, certain parts being shown as broken away or in section for the sake of clarity and the retainer clip being shown in the partially assembled position.
Figure 7:
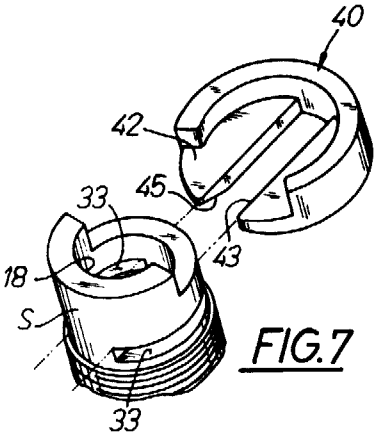
FIG. 7 is a fragmentary, perspective view of the retainer clip and a portion of the shank with which it slideably engages.

As shown in FIG. 6, the bevelled edge 45 has just contacted the corner 46 of the flange 30 and further insertion of the clip 40 into the transverse slot causes the shoulder and its valve stem to be forceably pushed downwardly into the shank, thus properly and firmly positioning the stem in its proper valve relationship with the shank.

Figure 5:
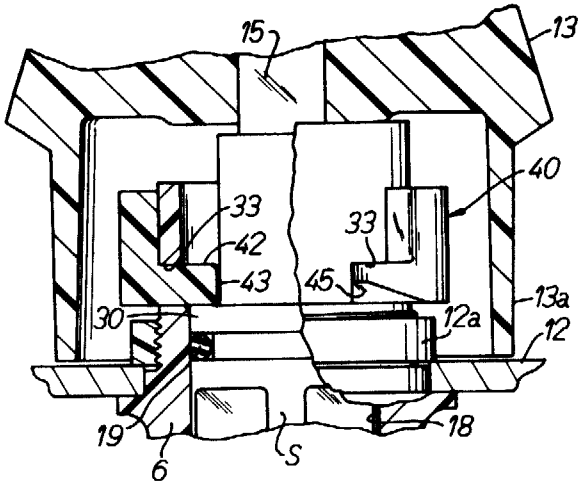
FIG. 5 is a view taken generally along the line 5—5 in FIG. 4, certain parts being shown as broken away or removed for the sake of clarity.

As shown clearly in FIGS. 4 and 5, the handle 13 has a downwardly and axially extending skirt portion 13a which when the faucet is assembled surrounds and encloses the clip 40 and prevents its removal from the transverse slot and consequently possible leakage of the faucet. In order to disassemble the faucet, it is only necessary to remove the screws 14, lift the handle off its non-circular connection with the top end of the stem and then grasp the clip with the fingers and transversely slide it from the [slot] *slots*. Removal of the clip in this manner thus frees the stem for axial withdrawal from its shank.

Figure 2:
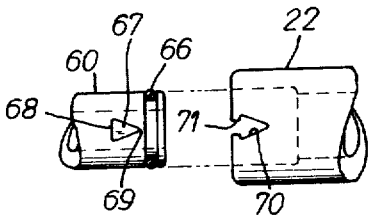
FIG. 2 is a fragmentary enlarged view of the interengageable parts between the shank and body connection, the view showing the parts in the disengaged position.
Figure 3:
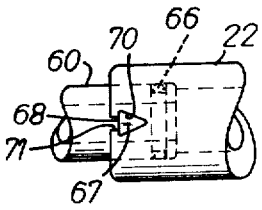
FIG. 3 is a view similar to FIG. 2 but showing the parts in engaged locked position.

Non-releasable interengaging means are also provided between the above described valve assemblies, the central shank 3, and spout 4. This means comprises a telescoping connection which includes the conduit 22 and the inner tubular member 60 of the central shank 3. FIG. 2 shows the parts in disengaged position while FIG. 3 shows the parts in engaged position. When in the engaged position, the o-ring seal 66 forms a sealed joint between the parts and once this connection is made, there is no occasion to disconnect that joint. In order to insure that the joint is not disconnected inadvertently the interengaging means between the telescoping members are shaped to preclude their withdrawal. More specifically, one of the telescoping members, for example, 60, has a triangular shaped projection 67 formed thereon and which has a rear flat side 68 and a front pointed end 69. The other telescoping member has a complementary shaped opening 70 including a narrow passage 71 through which the projection 67 can pass. Once the connection is made, as shown in FIG. 3, the narrow passage 71 precludes the withdrawal of the flat surface 68 from the complementary shaped opening 70. There is no rotation between the parts 60 and 22 and no occasion to disconnect these parts and consequently, the seal 66 does not need replacement. Thus, tight and permanent connection is made.

The spout also has a quick attachable and locked joint with the central shank, similar to the non-releasable, interengaging members above described. More specifically, the spout 4 also has a pair of triangularly shaped projections 74 formed integrally therein, one projection on each of opposite sides of the lower end of the spout. Complementary shaped recesses 75 are formed in the central, upright portion 76 of the shank 3 and these recesses also lockingly receive their respective projections 74 when the spout lower end is slid into the tubular portion 76, o-ring 5 therebetween forming the fluid seal.

I claim:

1. A non-rise faucet comprising a shank having a lower end through which fluid is introduced and also having an upper end including a stem chamber and communicable with said lower end for the reception of fluid therefrom, an elongated and removable stem slideable into said chamber and having a lower end forming a movable valve in said chamber to permit regulated flow of water through said faucet upon rotation of said stem in said chamber, said upper end of said shank having a slot arranged generally transverse to said elongated stem, said stem having a radial shoulder adjacent its upper end for alignment with said transverse slot, and a removable retainer clip having a portion slideably engaged in said transverse slot, said portion having a recess for embracing and engaging the upper end of said stem when said clip is inserted in said transverse slot, said clip also having a bevelled edge at one side thereof for engagement with said shoulder when said clip is initially inserted in said slot, whereby further engagement of said clip into said slot causes said shoulder and stem to be pushed downwardly in said shank for operative engagement of said valve, said clip when inserted in said transverse slot preventing longitudinal movement of said elongated stem.

2. The faucet set forth in claim 1 including a handle having an axially downwardly depending skirt, said handle being detachably secured to the upper end of said stem, said skirt surrounding said clip and the upper end of said shank when in assembled relationship to thereby prevent removal of said clip from said transverse slot.

3. The faucet set forth in claim 1 further including a laterally extending conduit in fluid receiving communication with the shank whereby when said valve is open, said fluid flows into said laterally extending conduit, a central spout supporting shank telescopingly engageable with said conduit for receiving fluid therefrom, and interengaging mating means between said shank and said conduit whereby said shank and conduit can be telescopingly engaged together, said interengaging means preventing disengagement of said shank and conduit.

4. The faucet set forth in claim 3 further characterized in that said inter-engaging means comprises a triangularly shaped projection and a complementary shaped opening which can be slid together for locking engagement and wherein said triangularly shaped projection is locked in said opening.

5. The faucet set forth in claim 2 further including a laterally extending conduit in fluid receiving communication with said shank whereby when said valve is open, said fluid flows into said laterally extending conduit, a central spout supporting shank telescopingly engageable with said conduit for receiving fluid therefrom, and interengaging mating means between said shank and said conduit whereby said shank and conduit can be telescopingly engaged together, said interengaging means preventing disengagement of said shank and conduit.

6. The faucet set forth in claim 5 further characterized in that said inter-engaging means comprises a triangularly shaped projection and a complementary shaped opening which can be slid together for locking engagement and wherein said triangularly shaped projection is locked in said opening.

*7. A non-rise faucet comprising a shank having a lower end through which fluid is introduced and also having an upper end including a stem chamber and communicable with said lower end for the reception of fluid therefrom, an elongated and removable stem slidable into said chamber and having a lower end forming a movable valve in said chamber to permit regulated flow of water through said faucet upon rotation of said stem in said chamber, said upper end of said shank having a slot arranged generally transverse to said elongated stem, said stem having a radial shoulder adjacent its upper end for alignment with said transverse slot, a removable retainer clip having a portion slidably engaged in said transverse slot, said portion having a recess for embracing and engaging the upper end of said stem above said shoulder when said clip is inserted in said transverse slot, said recess extending rearwardly beyond the forward advancing edge of said clip to provide a lateral blocking surface on each side of said recess for engagement with said shoulder to interlock said stem in said shank for operative engagement of said valve while preventing longitudinal movement of said elongated stem, and a handle having an axially downwardly depending skirt, said handle being detachably secured to the upper end of said stem, said skirt surrounding said clip and the upper end of said shank when in assembled relation to thereby prevent removal of said clip from said transverse slot.*

*8. A non-rise faucet assembly comprising a unitary shank having a lower end through which fluid is introduced and also having an upper end including a stem chamber and communicable with said lower end for the reception of fluid therefrom, an elongated and removable stem slideable into said chamber and having a lower end forming a movable disc valve in said chamber to permit regulated flow of water through said faucet upon constrained rotation of said stem in said chamber; an annular shoulder adjacent to the upper end of said stem projecting radially therefrom within said stem chamber, means for locking said stem against longitudinal withdrawal movement from said chamber while permitting free rotary movement thereof, comprising a pair of diametrically opposed slots in the lateral wall of said shank at approximately the level of the upper surface of said shoulder, and a locking clip formed of a disc having a central elongated recess between adjacent retaining surfaces adapted to be moved in a transverse direction through said transverse slots to force said annular shoulder towards the lower end of said shank by the sliding of said retaining surfaces against the top of said shoulder while accommodating the central portion of said stem within said elongated recess to permit free rotation thereof.*

*9. A non-rise faucet assembly comprising a shank having a lower end through which fluid is introduced and also having an upper end including a stem chamber and communicable with said lower end for the reception of fluid therefrom, an elongated and removable stem slidable into said chamber and having a lower end forming a movable disc valve in said chamber to permit regulated flow of water through said faucet upon constrained rotation of said stem in said chamber, said upper end of said shank having a pair of diametrically opposed slots arranged generally transverse to said elongated stem, said stem having a radial shoulder adjacent its upper end for alignment with said transverse slots, a removable retainer clip having a portion slidably engaged in said transverse slots, said portion having a recess for embracing and engaging the upper end of said stem above said shoulder when said clip is inserted in said transverse slots, and said recess extending rearwardly beyond the forward advancing edge of said clip to provide a lateral blocking surface on each side of said recess for engagement with said shoulder to interlock said stem in said shank for operative engagement of said valve while preventing longitudinal movement of said elongated stem.*

*10. The faucet assembly set forth in claim 9, including a handle having an axially downwardly depending skirt, said handle being detachably secured to the upper end of said stem, said skirt surrounding said clip and the upper end of said shank when in assembled relation to thereby prevent removal of said clip from said transverse slot.*

* * * * *